July 21, 1953  E. G. BRUNSVOLD  2,646,162
LOADING MACHINE FOR PARTIALLY FILLED BAGS
Filed Dec. 13, 1950  3 Sheets-Sheet 1
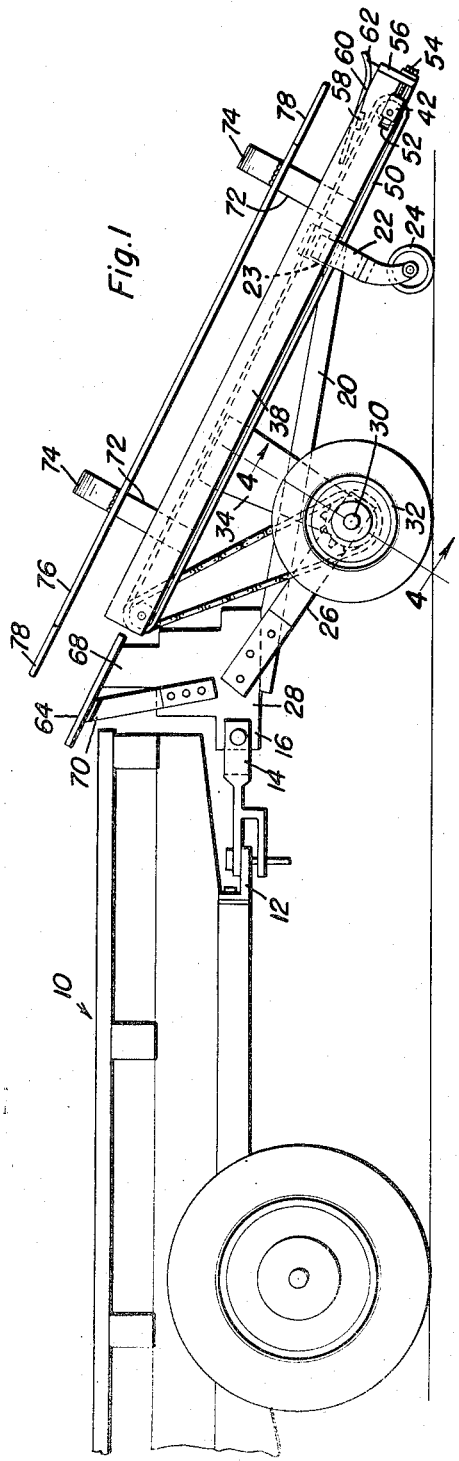
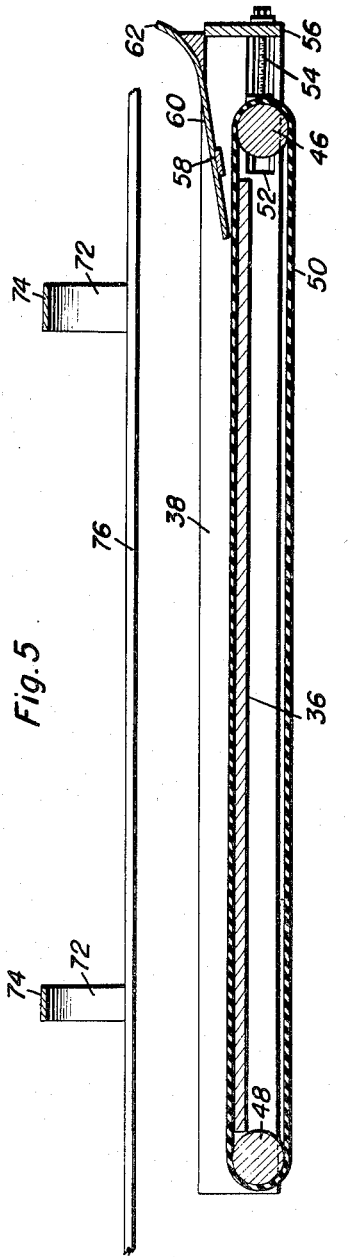
Inventor
Erick G. Brunsvold July 21, 1953  E. G. BRUNSVOLD  2,646,162
LOADING MACHINE FOR PARTIALLY FILLED BAGS
Filed Dec. 13, 1950  3 Sheets-Sheet 2
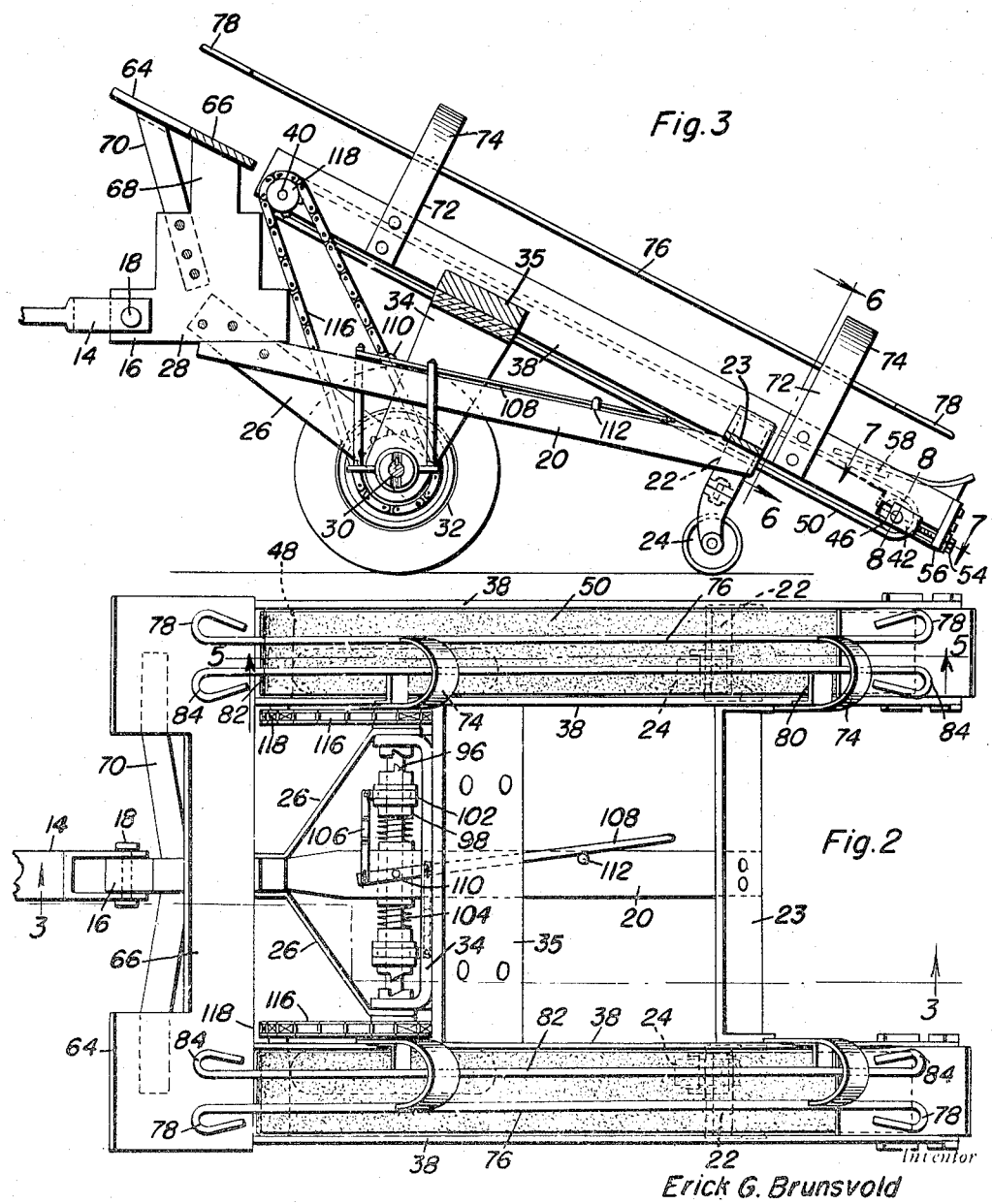
Inventor
Erick G. Brunsvold July 21, 1953  E. G. BRUNSVOLD  2,646,162
LOADING MACHINE FOR PARTIALLY FILLED BAGS
Filed Dec. 13, 1950  3 Sheets-Sheet 3
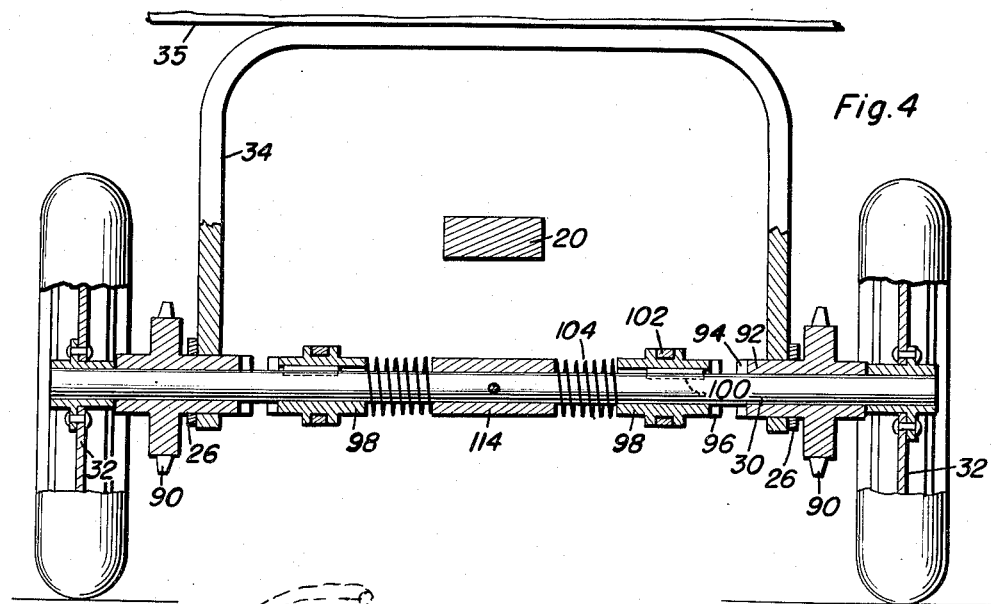
Fig. 4
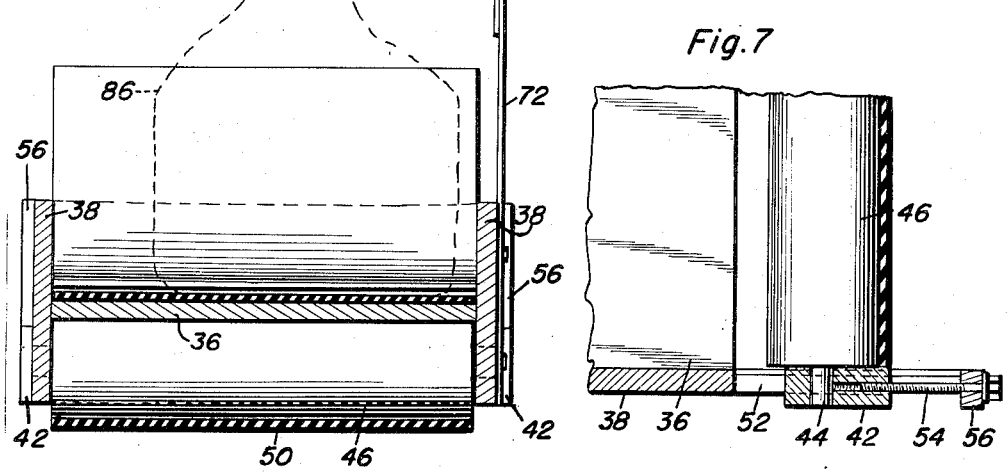
Fig. 6
Fig. 7
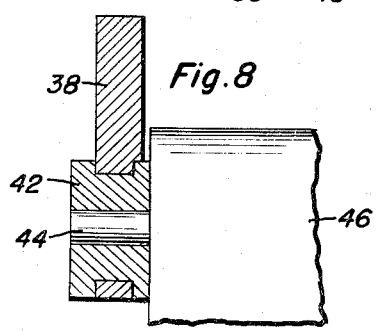
Fig. 8
Inventor
Erick G. Brunsvold
By Clarence A. O'Brien
and Harvey B. Jacobson
Attorneys Patented July 21, 1953

2,646,162

UNITED STATES PATENT OFFICE 2,646,162

LOADING MACHINE FOR PARTIALLY FILLED BAGS

Erick G. Brunsvold, Hatton, N. Dak.

Application December 13, 1950, Serial No. 200,646

3 Claims. (Cl. 198—204)

This invention relates to a loading machine adapted to be drawn along by a motor truck to facilitate loading into said truck partially filled bags having gathered top portions.

A primary object of the invention is to facilitate the loading of partially filled bags into a truck or the like, the machine having special means for frictionally supporting the gathered tops of the bags during the actual conveyance of the bags upwardly, thus preventing spilling of the contents of the bags.

Another object of the invention is to provide the machine which will carry out the preceding objects without damaging the bags.

Yet another object of the invention is to provide a machine which will carry out the loading of partially filled bags without necessitating the actual tying of the tops of the bags.

A last object to be mentioned specifically is to provide a machine of the character mentioned above which is relatively inexpensive and practicable to manufacture, which is safe, simple and convenient to use, especially in the loading of partially filled bags of potatoes in the field into a motor truck, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a side elevational view of the machine, illustrated as operatively mounted on the rear of a motor truck;

Figure 2 is a top plan view of the machine;

Figure 3 is a vertical longitudinal sectional view of the machine; the figure being taken substantially on the line 3—3 in Figure 2;

Figure 4 is a fragmentary view, on an enlarged scale, of the forward and lower portion of the machine, portions being shown in elevation and other portions being shown in vertical section;

Figure 5 is a fragmentary vertical sectional view taken substantially on the line 5—5 in Figure 2;

Figure 6 is a sectional view taken on the line 6—6 in Figure 3;

Figure 7 is a horizontal sectional view taken substantially on the line 7—7 in Figure 3; and Figure 8 is a substantially vertically sectional view taken on the line 8—8 in Figure 3.

Similar characters of reference designate similar or identical elements and portions throughout the specification and throughout the different views in the drawings.

Referring to the drawings in detail, this invention is adapted to be used with an environment which will ordinarily include a motor truck, fragmentarily shown at 10 in Figure 1, this motor truck being ordinarily equipped with a rear drawbar structure 12, which will coact with a drawbar structure 14 secured pivotally on a forwardly projecting portion 16 of the frame of the machine which is the subject matter of this disclosure, by means of a pivot bolt 18.

The machine includes an elongated, centrally disposed, main frame element 20 which extends longitudinally of the machine and is secured at the rear end thereof to a cross frame member 23. This cross frame member is carried on caster wheels 24, in opposed relation near the rear end of the machine, while the front end portion of the main frame member 20 is carried on rearwardly diverging braces 26, which braces are also secured to a front end pillar member 28 of the frame, and the pillar member may be integral with the already mentioned element 16. The braces 26 depend slightly toward the rear of the machine and carry the axle 30, upon the ends of which are mounted the front ground contacting, pneumatic tired wheels 32. An inverted U-shaped frame member 34 has its arms terminating in bearings on the axle 30. The bight portion of the frame element 34 supports a cross frame member 35 which, along with cross frame member 23, provides support for and connecting means for the elongated and downwardly and rearwardly inclined conveyor chutes or tables 36, indicated in Figure 7, provided in duplicate, one on each side of the machine. Lateral guard plates 38 are rigidly secured to each side of each of the elements 36 and the plates 38 extend the full length of each conveyor assembly, as possibly best illustrated in Figure 6. In other words, the above elements 36 and 38 comprise channels, one on each side of the machine, for the endless conveyor elements which will now be described.

As mentioned previously in this disclosure, the machines will ordinarily be drawn by a motor truck 10 and the conveyors will be driven by short shafts 40 journaled to and between the upper end portions of the lateral plates 38 of the conveyor assembly. At the lower and rear ends of the lateral plates 38, a pair of bearing blocks 42 are slidably adjustably mounted and trunnions 44 of the lower end conveyor rollers 46 are journaled in these bearing blocks 42, while the upper end rollers 48 are rigidly secured to the said shafts 40, the actual conveyor belt, of whatever character is deemed practicable and expedient, being of endless character and being driven by the rollers 48 and guided by the rollers 46. The endless conveyor element 50 can be tightened as required, since the bearing members 42 are slidable in slots 52 provided in the said lateral plates 38 and headed adjusting screws 54 are threaded into the bearing blocks 42 and have their heads in engagement with end plates 56 on the lower ends of the lateral plates 38, rotation of the screws 54 allowing the tightening and loosening of the endless conveyor elements 50.

Cross braces 58, terminally secured to opposing portions of the lateral plates 38, above the rollers 46, support receiving platforms 60 at the lower end of each conveyor assembly. These platforms 60 may be simple plates having upwardly curved rear end portions 62. At the upper end of each conveyor assembly, another receiving platform 64 is mounted, this upper platform being of plate character and substantially U-shaped with the bight portion 66 rigidly secured to the upper inclined end of the pillar element 28 of the frame, while braces 70 are secured at their lower ends to this same pillar element 28 and diverge upwardly and outwardly for connection to the arm portions of the upper platform 64.

An important portion of the invention relates to means provided to guide the gathered top portions of the bag while the bags are being conveyed upwardly. The construction for this purpose includes a pair of rigid straps 72 rigidly secured at their lower ends to the innermost pair of the lateral plates 38, the straps being preferably placed one near the top and one near the bottom of each conveyor assembly. The upper end portions of these straps 72 are made resilient and are curved as indicated at 74 to depend in offset relation from the main portions of the straps 72, and these curved portions terminally support intermediate portions of elongated rod rails 76 having returned end portions 78. Angle brackets 80 have their vertical flanges rigidly secured to intermediate portions of the straps 72 and support similar elongated rod rails 82 in parallel horizontally spaced relation with respect to the rails 76 and these rails extend parallel to the upper flight of the conveyor element 50. The rails 76 and 82 receive the gathered top portions 88 of the bags 86, holding the same to prevent spilling of the contents of the bags 86 while the same are being elevated. The ends of the rails 82 are returned as indicated at 84 in Figure 2, and the returned ends 78 and 84 of the opposing rails will be effective in preventing tearing of the said gathered top portions of the bags. It should be here noted that the rails may, as indicated in the drawings, be bars of circular cross section and these bars may be slightly resilient to supplement the resiliency in the curved portions 74.

Sprocket wheels 90 are rotatably secured coaxially of the axles 30, and hub portions 92 of the sprocket wheels 90 are provided with teeth 94 which engage teeth 96 of clutch sleeves 98 when the latter are in operative position. The clutch sleeves 98 are keyed to the axle 30 for axially sliding motion thereon while giving driving connection between the axle and the clutch sleeve, as indicated at 100, and clutch sleeve operating arms terminating in clutch sleeve engaging saddles 102 move the clutch sleeve axially of the axle 30 against the action of the springs 104, when the controlling lever 108 is manually shifted. The lever 108 is pivoted, as indicated at 110, on the main frame member 20, and a pin 112, inserted in the frame member 20, holds the lever 108 in the position indicated in Figure 2, against the action of the springs 104, when the clutch sleeves 98 are in inoperative positions. A sleeve 114 may be rigidly secured centrally of the axle 30 to form an abutment for the inner end of the springs 104 which are coaxially mounted on the axle between the abutment member and the adjacent ends of the clutch sleeve members 98. The sprocket wheels 90 drive endless chains 156, which chains are entrained over sprocket wheels 116 on the shafts 40, whereby the upper rollers 48 are driven and the conveyors are actuated.

The operation of this invention will be clearly understood from a consideration of the foregoing description of the mechanical details thereof, taken in connection with the drawings and the above recited objects of the invention. In recapitulation, it need only be noted that the bags will be ordinarily lifted by hand onto the lower platforms 62, with the gathered top portions 88 held upwardly so that the subsequent movement of the bags along the conveyors will result in these gathered top portions of the bags being held between the rails 76 and 82, preventing the spilling of the contents of the bags until the same reach the upper platform 64. At that time, the bags will be lowered into the truck 10. Although not limited to use for gathering potatoes in the field, this invention is ideally adapted for such use. The partially filled bags of potatoes are arranged, during the gathering procedure, in spaced rows in the field, and the motor truck 10 with the loading machine is driven between adjacent rows of partially filled bags. Operators lift the bags onto the lower platforms 60 at each side of the machine.

Further description would appear unnecessary.

Having described the invention, what is claimed as new is:

1. A loading machine adapted to be drawn along by a motor truck to facilitate loading into said truck partially filled bags having gathered but unsecured top portions, comprising a rearwardly and downwardly inclined frame, an endless conveyor operatively mounted therein and having a top flight travelling upwardly substantially parallel to said frame, and a pair of parallel elongated guide rails supported on said frame substantially parallel to said top flight, said guide rails being resiliently positioned with respect to each other and adapted to frictionally engage and support said gathered top portions of the bags to prevent spilling of the contents thereof.

2. A loading machine for elevating partially filled bags having gathered but unsecured top portions comprising a wheeled frame, a conveyor operatively mounted on said frame and having an upwardly travelling top flight rearwardly and downwardly inclined, elongated guide rails resiliently supported on said frame in parallel spaced relation above said conveyor and adapted to frictionally engage and support said gathered top portions of the bags supported on said top flight to prevent spilling of the contents thereof, and receiving platforms mounted on the frame one at each end of the conveyor and beneath the corresponding ends of said guide rails.

3. A trailer type loading machine for elevating partially filled bags having gathered but unsecured tops comprising a wheel supported frame, a rearwardly and downwardly inclined table mounted on said frame, an endless conveyor, the top flight of said conveyor traveling upwardly over said table, upstanding guard plates adjacent the sides of said table, straps rigidly secured in spaced apart relation on one of said guard plates, offset resilient down turned ends on said straps, a rail mounted on the ends of said straps, brackets secured to intermediate portions of said straps, a rail mounted on said brackets, said rails being in spaced parallel relation to the top flight of said conveyor, said rails being adapted to frictionally embrace the gathered tops of bags carried by said conveyor.

ERICK G. BRUNSVOLD.

References Cited in the file of this patent

UNITED STATES PATENTS

| Number | Name | Date |
|---|---|---|
| 875,314 | Bigelow | Dec. 31, 1907 |
| 1,570,256 | Hunt | Jan. 19, 1926 |
| 1,818,652 | Scott | Aug. 11, 1931 |
| 2,356,472 | Rothaug | Aug. 22, 1944 |
| 2,402,465 | Templeton | June 18, 1946 |